US010804963B2

(12) United States Patent
Snyder et al.

(10) Patent No.: US 10,804,963 B2
(45) Date of Patent: *Oct. 13, 2020

(54) WAVE GUIDE WITH FLUID PASSAGES

(71) Applicant: Raytheon Technologies Corporation, Farmington, CT (US)

(72) Inventors: Ryan K. Snyder, Glastonbury, CT (US); Eric J. Heims, Avon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,393

(22) Filed: Jul. 19, 2019

(65) Prior Publication Data
US 2019/0341965 A1 Nov. 7, 2019

Related U.S. Application Data

(63) Continuation of application No. 15/480,794, filed on Apr. 6, 2017, now Pat. No. 10,411,756.

(51) Int. Cl.
*H04B 3/52* (2006.01)
*F01D 21/00* (2006.01)
*H01P 5/04* (2006.01)
*F16L 9/19* (2006.01)
*F16L 41/02* (2006.01)

(52) U.S. Cl.
CPC ............ *H04B 3/52* (2013.01); *F01D 21/003* (2013.01); *F16L 9/19* (2013.01); *F16L 41/021* (2013.01); *H01P 5/04* (2013.01); *F05D 2220/32* (2013.01); *F05D 2260/80* (2013.01); *F05D 2270/01* (2013.01)

(58) Field of Classification Search
CPC ............ B60K 11/02; H04B 3/52; F16L 41/00
See application file for complete search history.

(56) References Cited

U.S. PATENT DOCUMENTS

| 6,512,311 | B1 | 1/2003 | Metra et al. |
| 6,747,213 | B2 | 6/2004 | Bonicel |
| 7,362,235 | B1 * | 4/2008 | Normann ................ E21B 47/13 |
| | | | 340/854.8 |

(Continued)

FOREIGN PATENT DOCUMENTS

| EP | 2961087 | 12/2015 |
| GB | 2065410 | 6/1981 |
| WO | 2015130563 | 9/2015 |

OTHER PUBLICATIONS

Extended European Search Report for European Application No. 18166044.0 dated Aug. 6, 2018.

*Primary Examiner* — Dean O Takaoka
*Assistant Examiner* — Alan Wong
(74) *Attorney, Agent, or Firm* — Carlson, Gaskey & Olds, P.C.

(57) ABSTRACT

A wave guide assembly for a control and diagnostic system for a machine, the wave guide assembly includes a housing defining an exterior surface and an internal cavity extending between distal ends. A wave guide is defined within the internal cavity. At least one open conduit is defined within the internal cavity providing a space for routing conductors through the housing. A fluid passage is defined within the internal cavity separate from the wave guide. A control and diagnostic system for a machine and a gas turbine engine are also disclosed.

20 Claims, 9 Drawing Sheets

(56) References Cited

U.S. PATENT DOCUMENTS

| | | |
|---|---|---|
| 8,698,577 B2 | 4/2014 | Sherrer et al. |
| 9,322,224 B2 * | 4/2016 | Chabas ................. E21B 17/028 |
| 10,411,756 B2 * | 9/2019 | Snyder ..................... F16L 9/19 |
| 2008/0245980 A1 | 10/2008 | Diatzikis |
| 2011/0227337 A1 | 9/2011 | Kattler et al. |
| 2012/0124965 A1 | 5/2012 | Grabowski et al. |
| 2016/0254583 A1 | 9/2016 | Sherrer et al. |
| 2017/0366228 A1 | 12/2017 | Bobrek et al. |

* cited by examiner

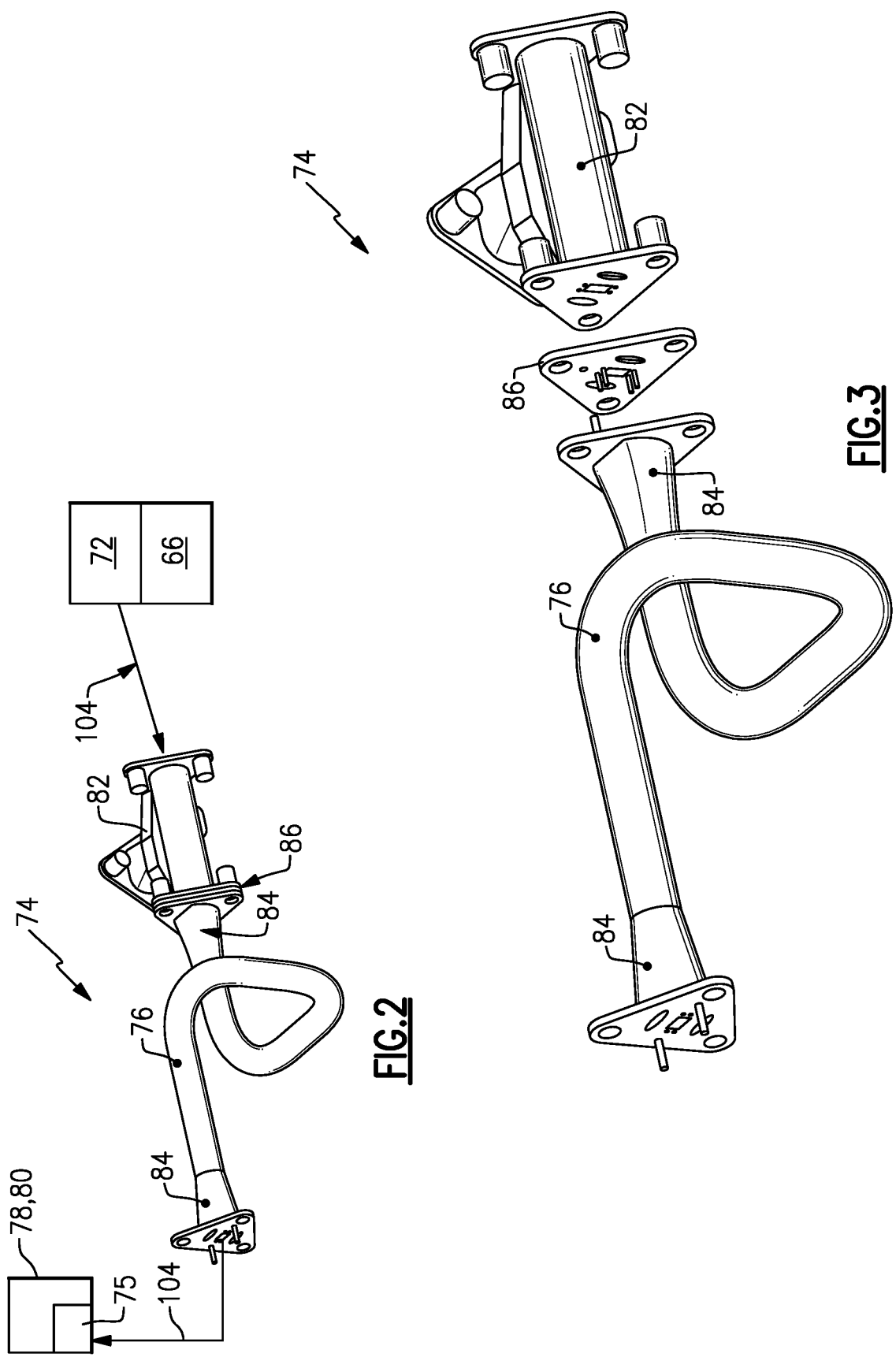

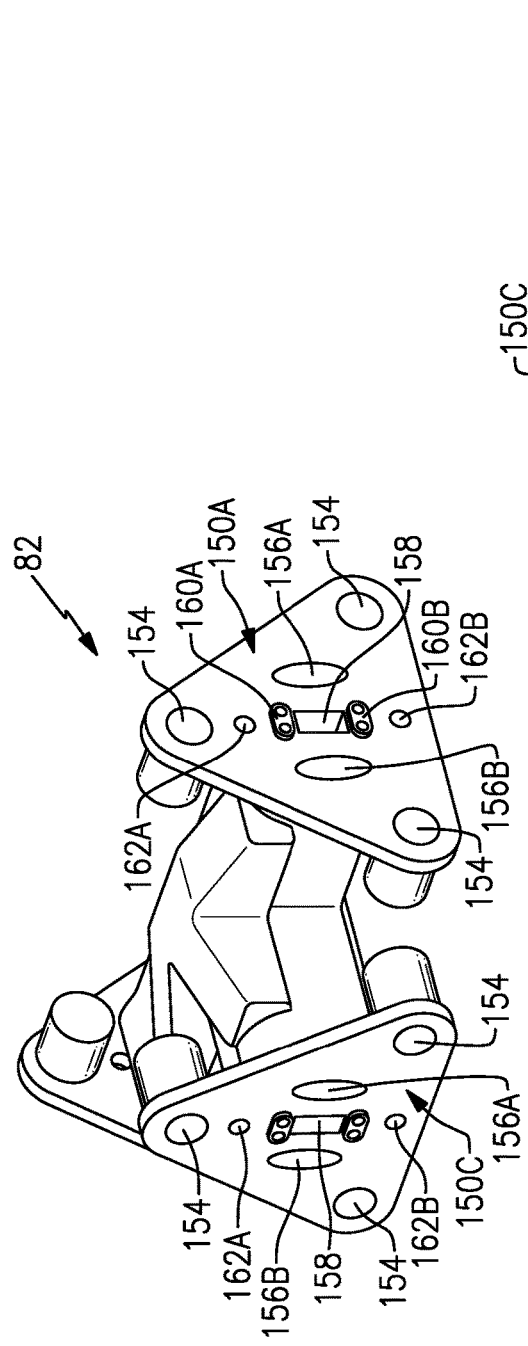
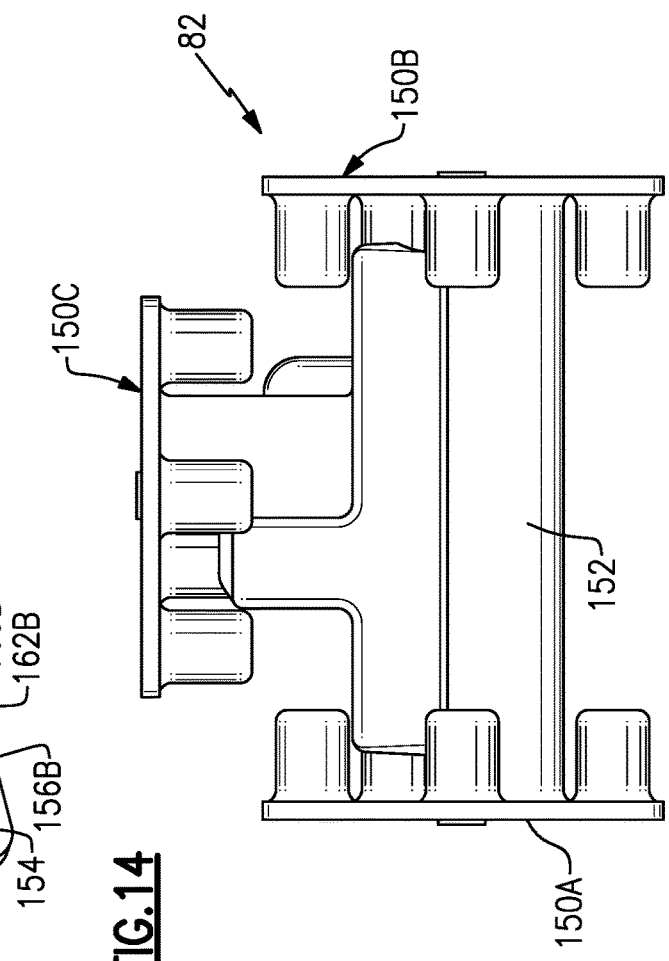
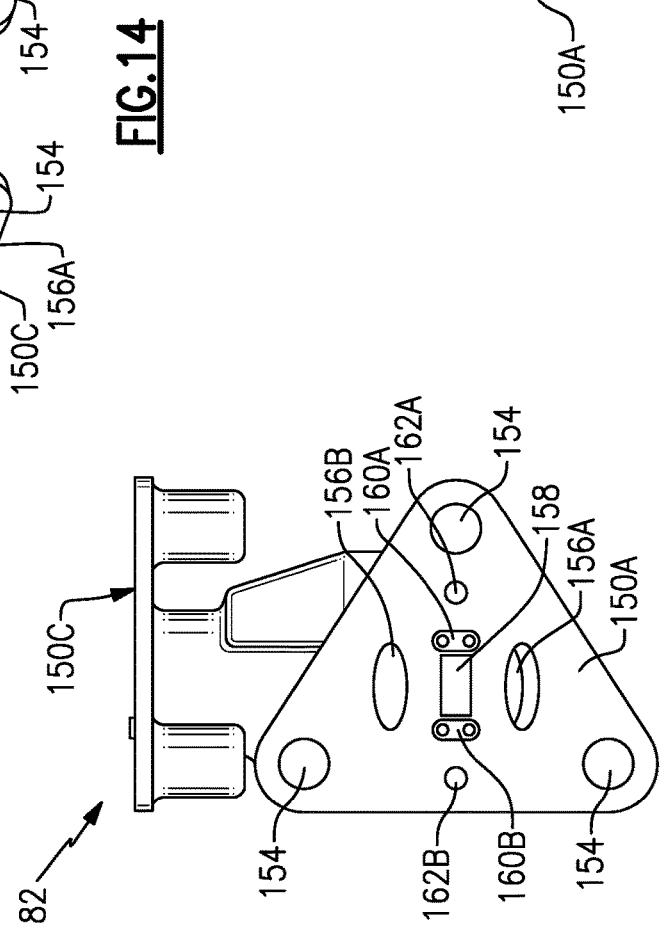
FIG. 14
FIG. 15
FIG. 16

WAVE GUIDE WITH FLUID PASSAGES

CROSS-REFERENCE TO RELATED APPLICATIONS

This application is a continuation of U.S. patent application Ser. No. 15/480,794, filed Apr. 6, 2017.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Devices that are used to control and sense operation of the gas turbine engine, or any machine, communicate with a controller through many different wires that are gathered in a wire harness. The wire harness includes each of the individual wires required to provide power and communication. In many instances, dual wires are routed to a device or sensor to provide a required redundancy in case of failure. Moreover, many of the wires require shielding to assure reliable transmission of communication signals. The number of wires along with the accompanying shielding, and braiding a mass a significant amount of weight. Irregular shapes from the bundling of wires creates challenges in supporting and securing the wire harness throughout engine.

Turbine engine manufacturers continue to seek further improvements to engine performance including improvements in reliability as well as in thermal, transfer and propulsive efficiencies.

SUMMARY

In a featured embodiment, a wave guide assembly for a control and diagnostic system for a machine, the wave guide assembly includes a housing defining an exterior surface and an internal cavity extending between distal ends. A wave guide is defined within the internal cavity. At least one open conduit is defined within the internal cavity providing a space for routing conductors through the housing. A fluid passage is defined within the internal cavity separate from the wave guide.

In another embodiment according to the previous embodiment, includes an end fitting attached to each end of the housing. The end fitting includes a flared tube tapering outward to an attachment flange and the attachment flange.

In another embodiment according to any of the previous embodiments, includes a coupling for branching the wave guide and fluid passage into two separate paths extending in different directions. The coupling includes three ends with a wave guide passage and a fluid coupling passage extending to each of the three ends.

In another embodiment according to any of the previous embodiments, includes a seal plate attached between the end fitting and the coupling. The seal plate includes a wave guide opening corresponding to the wave guide. A fluid opening corresponds to the fluid passage and seals surrounding the fluid opening.

In another embodiment according to any of the previous embodiments, includes an alignment pin corresponding with an alignment opening for aligning the wave guide, at least one open conduit and fluid passage between the housing, seal plate, end fitting and coupling.

In another embodiment according to any of the previous embodiments, the wave guide includes a rectangular passage in cross-section centered within the internal cavity. The rectangular passage defines a size corresponding with a desired frequency range of a wave form signal.

In another embodiment according to any of the previous embodiments, the housing includes a tube with a circular cross-section and the wave guide is centered within the cross-section.

In another embodiment according to any of the previous embodiments, the fluid passage includes a first fluid passage and a second fluid passage disposed on opposite sides of the wave guide.

In another embodiment according to any of the previous embodiments, the coupling includes a first fluid coupling passage aligning with the first fluid passage and a second fluid coupling passage aligning with the second fluid passage and each of the first fluid coupling passage and the second fluid coupling passage extends to each of the three ends of the coupling.

In another embodiment according to any of the previous embodiments, the coupling includes a conductor assembly branching a conductor between each of the three ends.

In another featured embodiment, a control and diagnostic system for a machine includes a main transceiver mounted proximate the machine. The transceiver generates and receives radio frequency waves corresponding to information for control and monitoring of engine operation. A wave guide assembly is in communication with the main transceiver. The wave guide assembly includes a housing defining an internal cavity and an end fitting attached to each end of the housing. The internal cavity includes a wave guide defining a transmission path for a wave form signal communicated with the main transceiver and a fluid passage defining a flow path for fluid. A fluid source is in communication with the fluid passage of the wave guide assembly. At least one remote transceiver is attached to an end of the wave guide assembly and in communication with the main transceiver through a wave form signal communicated through the wave guide. At least one fluid device is in fluid communication with the fluid passage defined within the wave guide assembly.

In another embodiment according to the previous embodiment, the wave guide assembly includes a tubular housing defining a circular cross-section. The wave guide defines a rectangular passage centered within the circular cross-section and the at least one fluid passage includes a first fluid passage and a second fluid passage defined on opposite sides of the wave guide.

In another embodiment according to any of the previous embodiments, includes a coupling for branching the wave guide and fluid passages into two separate paths extending in different directions. The coupling includes three ends with a wave guide passage and a fluid coupling passage extending to each of the three ends.

In another embodiment according to any of the previous embodiments, includes a seal plate attached between the end fitting and the coupling. The seal plate includes a wave guide opening corresponding to the wave guide, a fluid opening corresponding to the fluid passage and seals surrounding the fluid opening.

In another embodiment according to any of the previous embodiments, wave guide includes a rectangular cross-section that defines a size corresponding with a desired frequency range of a wave form signal.

In another featured embodiment, a gas turbine engine includes a control and diagnostic system. The control and diagnostic system includes a main transceiver mounted proximate the gas turbine engine. The transceiver generates and receives radio frequency waves corresponding to information for control and monitoring of engine operation. A wave guide assembly in communication with the main transceiver. The wave guide assembly includes a housing defining an internal cavity and an end fitting attached to each end of the housing. The internal cavity includes a wave guide defining a transmission path for a wave form signal communicated with the main transceiver and a fluid passage defining a flow path for fluid. A fluid source is in communication with the fluid passage of the wave guide assembly. At least one remote transceiver is attached to an end of the wave guide assembly and in communication with the main transceiver through a wave form signal communicated through the wave guide. At least one fluid device is in fluid communication with the fluid passage defined within the wave guide assembly.

In another embodiment according to the previous embodiment, the wave guide assembly includes a tubular housing defining a circular cross-section. The wave guide defines a rectangular passage centered within the circular cross-section and the at least one fluid passage includes a first fluid passage and a second fluid passage defined on opposite sides of the wave guide.

In another embodiment according to any of the previous embodiments, includes a coupling for branching the wave guide and fluid passages into two separate paths extending in different directions. The coupling including three ends with a wave guide passage and a fluid coupling passage extending to each of the three ends.

In another embodiment according to any of the previous embodiments, includes a seal plate attached between the end fitting and the coupling. The seal plate includes a wave guide opening corresponding to the wave guide, a fluid opening corresponding to the fluid passage and seals surrounding the fluid opening.

In another embodiment according to any of the previous embodiments, wave guide includes a rectangular cross-section that defines a size corresponding with a desired frequency range of a wave form signal.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a perspective view of an example wave guide assembly.

FIG. 3 is an exploded view of the example wave guide assembly.

FIG. 14 is a perspective view of an example coupling embodiment.

FIG. 15 is a side view of the example coupling.

FIG. 16 is a top view of the example coupling.

DETAILED DESCRIPTION

Figure 1:
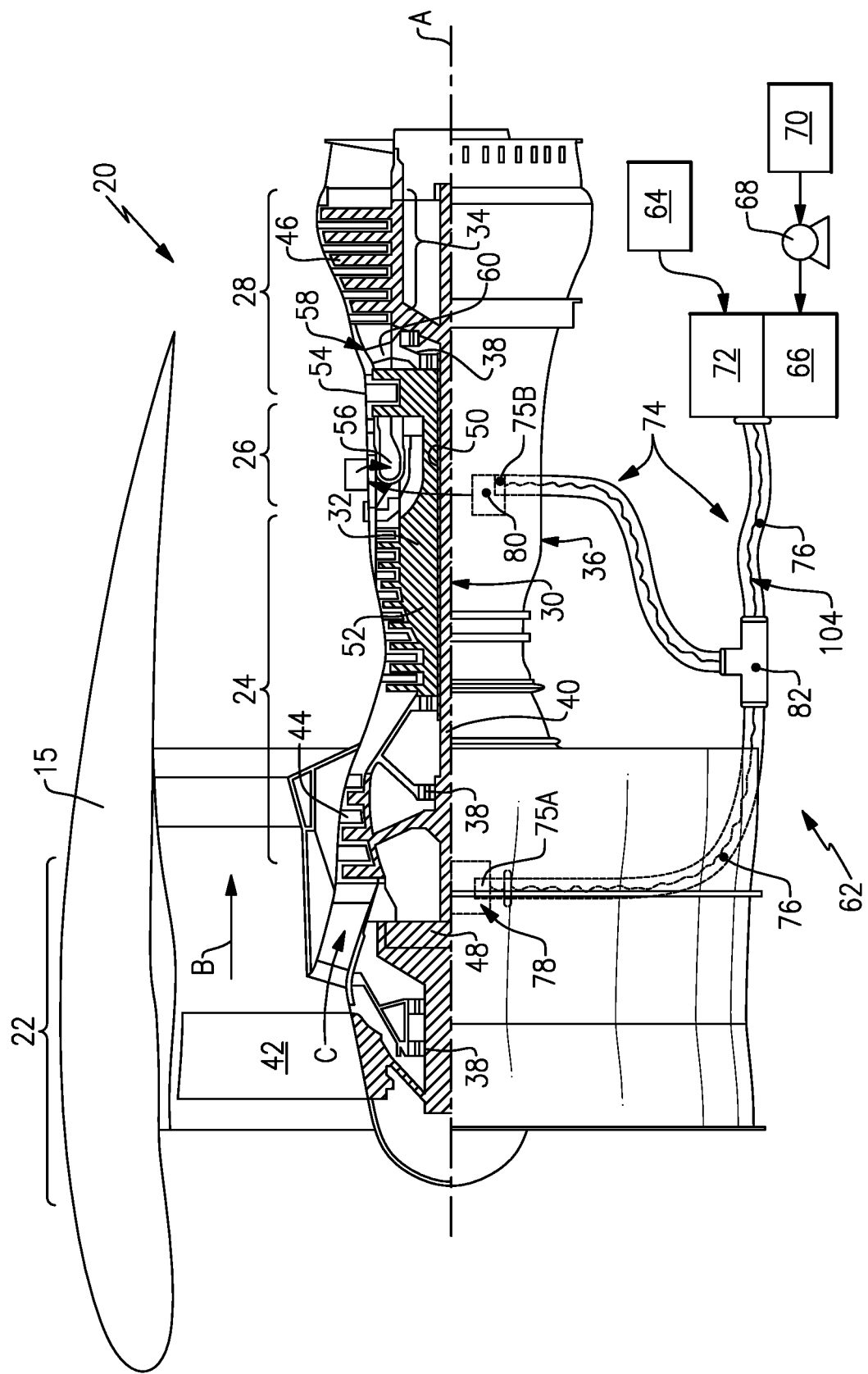
FIG. 1 is a schematic view of an example gas turbine engine including an example control system embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

The disclosed gas turbine engine includes a control and diagnostic system 62 that communicates information between various sensors, actuators and components of the gas turbine engine 20. The example control and diagnostic system 62 includes a main transceiver 72 coupled to a wave guide assembly 74. The example main transceiver 72 generates and receives wave form signals. In this disclosure wave form signals includes microwave high frequency signals, radio frequency signals and any other wave form format that can be utilized to send and receive information and commands through the wave guide assembly 74 to components and sensors throughout the gas turbine engine 20.

Although the control and diagnostic system 62 is disclosed by way of example in view of a gas turbine engine 20, it is within the contemplation of this disclosure that the control and diagnostic system 62 may be utilized with any machine or system. A machine, such as for example an automobile power plant, a power conversion device or any other system requiring communication between a controller and a plurality of different devices would benefit from this disclosure.

In the disclosed example embodiment, the wave guide assembly 74 defines a transmission pathway for wave form signal communication with sensor 78 and component 80. As appreciated, the sensor 78 and the component 80 are representative of various components and devices utilized through the engine to sense current engine operating conditions and control operation of the engine. The engine 20 will include many sensors 78 and many components 80 arranged throughout the engine that generate or receive information and commands from an engine controller 64. The engine controller 64 can be part of full authority digital engine control, commonly known as a FADEC, or receive information from the FADEC. Each of the sensors 78 and the component 80 includes a second or remote transceiver 75a, 75b that communicates with the main transceiver 72 through wave form signals routed through the wave guide assembly 74.

The wave guide assembly 74 defines a communication path through which wave signals schematically shown at 104 are routed between the main transceiver 72 and various remote transceivers 75a, 75b associated with each sensor 78 and component 80. It should be appreciated, that the engine 20 may include several separate wave guide assemblies 74 providing communication pathways for different systems. Moreover, each wave guide assembly 74 may provide communication from different main transceivers 72.

The disclosed example wave guide assembly 74 includes wave guide tubes 76 coupled to the main transceiver 72 on one end and the sensor 78 or component 80 on other ends. The example wave guide assembly 74 defines the passages that are utilized to communicate with the various devices within the gas turbine engine 20. Rather than including individual electric conductor or wires separately run between each of the components, the example wave guide assembly 74 provides a common wave guide passageway for each of the components 80 or sensors 78. The main transceiver 72 transmits and receives multiple wave form frequencies through the same passageway for communicating with different sensors and components concurrently.

The wave guide tube 76 includes multiple tubes 76 of various shapes to extend to sensors and actuators throughout the engine 20. The wave guide tubes 76 are secured together at a coupling 82 such that a single passage is split into different passages that extend in different directions.

In this example, the wave guide assembly 74 further includes integral fluid conduits to communicate fluid from a fluid source 70 that is pumped by a pump 68 into a valve 66. The valve 66 is in communication with one end of the wave guide assembly 74 and provides for the communication of fluid to each of the components that require such fluid. In this example, fluid is communicated to the component 80 that provides for the regulation of fuel being supplied to the combustor 56. The fluid transported can provide a cooling function and include fuel or other coolant fluid. The fluid may also include hydraulic fluid used to power components.

Referring to FIG. 2 with continued reference to FIG. 1, the example wave guide assembly 74 includes a plurality of wave guide tubes 76 that define a communication path between a main transceiver 72 and remote transceivers 75a, 75b associated with a sensor, actuator or other component. The wave guide assembly 74 includes coupler 82 that splits the communication path into different wave guide tubes 76 to communicate with a plurality of components that are all in communication with a common wave guide defined within the wave guide tube 76.

Referring to FIG. 3 with continued reference to FIG. 2, the example wave guide assembly 74 includes the coupling 82, the wave guide tube 76, end fittings 84 and a seal plate 86. The end fittings 84 enable coupling of the wave guide tube 76 to the coupling 82 and to the main transceiver 72 and remote transceivers 75a, 75b. The seal plate 86 is provided with each of the end fittings 84 to maintain a fluid tight connection and provide a desired alignment of passages between the various elements.

Figure 4:
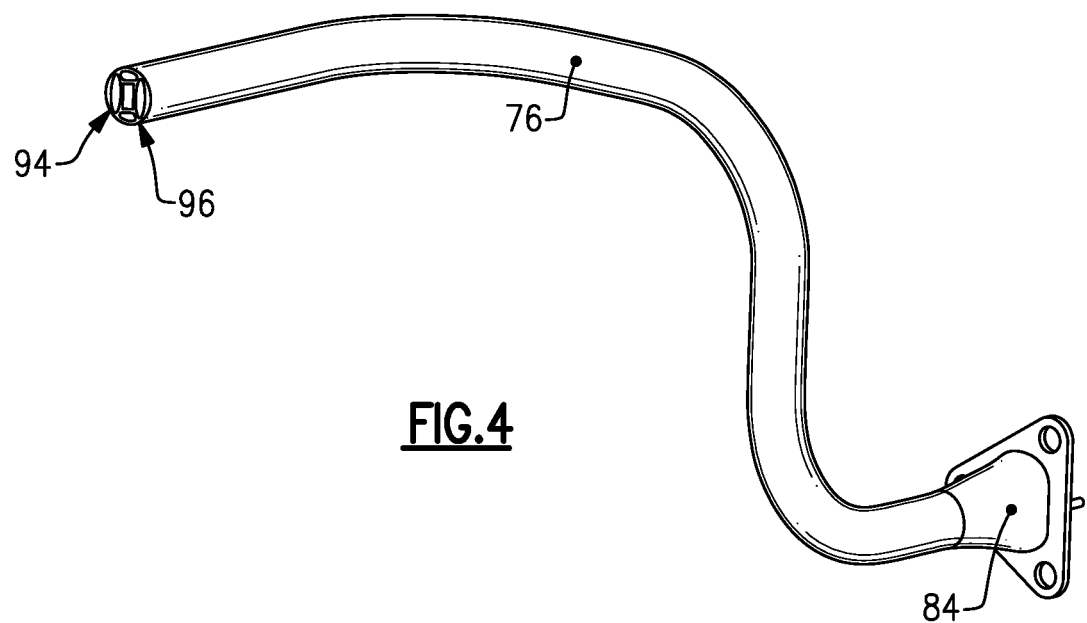
FIG. 4 is a perspective view of a wave guide tube.
Figure 5:
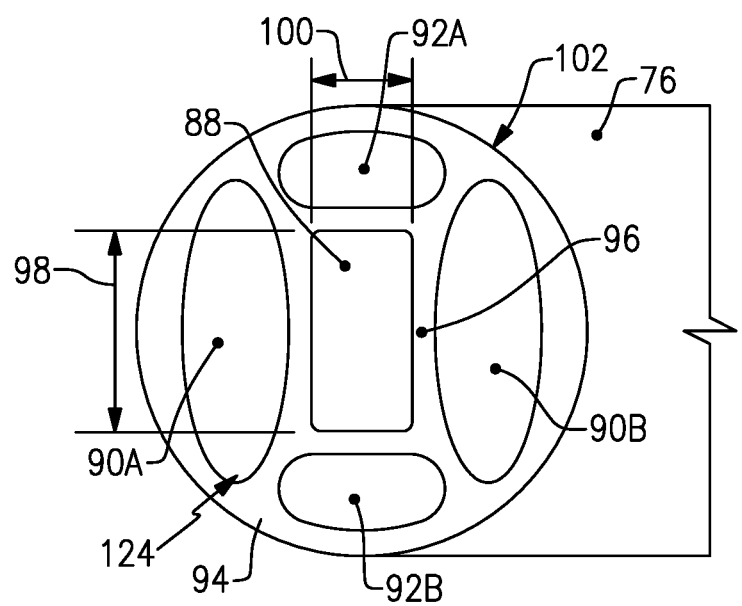
FIG. 5 is a cross-sectional view of the example wave guide tube.
Figure 6:
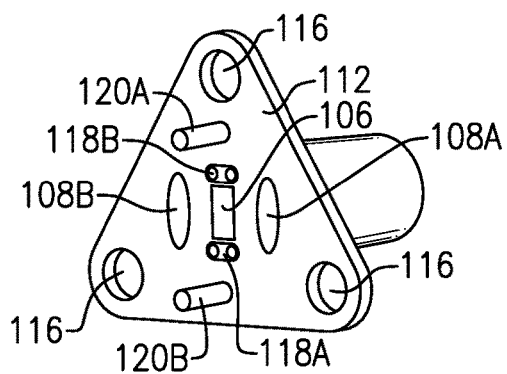
FIG. 6 is a front perspective view of an example end fitting.
Figure 7:
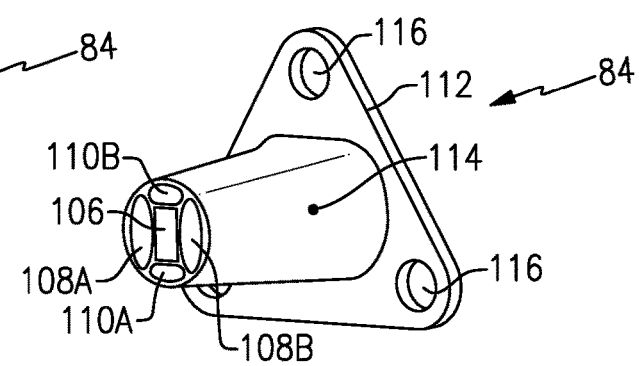
FIG. 7 is a rear perspective view of an example end fitting.
Figure 8:
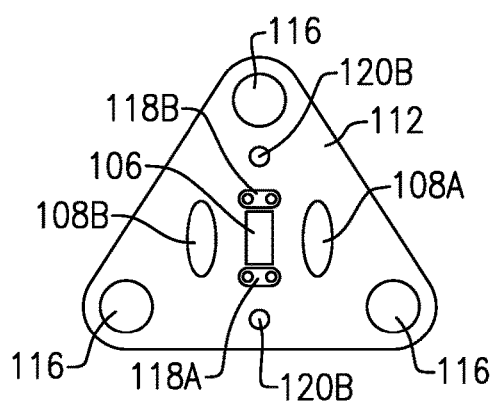
FIG. 8 is a front view of the example end fitting.
Figure 9:
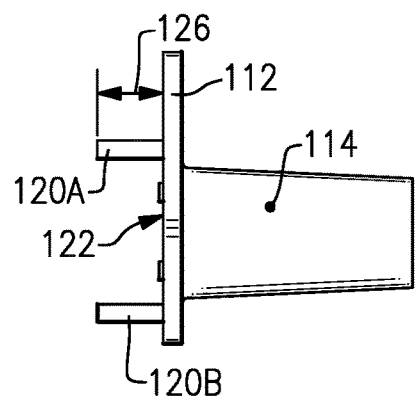
FIG. 9 is a side view of the example end fitting.
Figure 10:
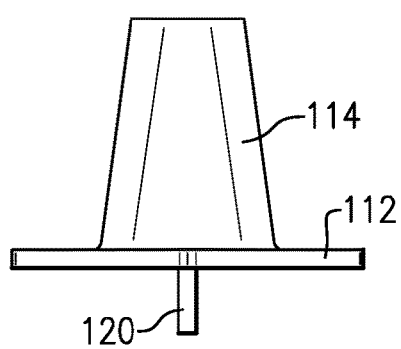
FIG. 10 is a top view of the example end fitting.

Referring to FIGS. 4 and 5, the example wave guide tube 76 includes a circular cross-section 94 that defines an internal cavity 124. In this example, the wave guide tube 76 includes a round or tubular outer periphery 102. Within the outer periphery 102 of the wave guide tube 76 is defined the internal cavity 124. The internal cavity 124 is substantially circular and includes a wave guide 88 that extends entirely through the wave guide tube 76. Disposed on either side of the wave guide 88 are fluid passages 90a and 90b. Open conduits 92b and 92a are disposed above and below the wave guide 88 as pictured in FIG. 5. As appreciated, the term side and above and below are relative terms referring to the relative position of the internal passages in the orientation shown in FIG. 5. Other orientations may be utilized and are within the contemplation of this disclosure.

The open conduits 92a and 92b enable threading of electrical conduits such as wire, fiber optic lines or other electrically conductive means as are known.

The example wave guide 88 is rectangular in cross-section and defines an open space through which wave form signals may pass. The height 98 and width 100 is determined based on the frequency range for the wave form signals that are transmitted there through. In one example, the wave form signals comprise a high frequency microwave signal. In other example embodiments, the wave form signal may comprise radio frequency signals or other wave form signal formats as are known and understood to those skilled in the art. The wave guide 88 may therefore be of a different size and shape as determined with regard to a specific wave form signal.

The fluid passage 90a and 90b are elliptical in cross-section and convey fluid through the wave guide tube 76. The fluid passages 90a and 90b enable fluid to be pumped out to a component through one of the passages and then back through another of the fluid passages all within the common wave guide tube 76.

The open conduits 92a and 92b are disposed above and below the wave guide 88 and between the fluid passages 90a and 90b. The open conduits are of an ovoid shape to maximize space available within the tubular cross-section 94 of the wave guide tube 76.

The inner cavity 124 includes walls 96 that define the passages including the wave guide 88, the fluid passages 90a and 90b and the open conduits 92a and 92b. The circular cross-section 94 provides a desired strength and fluid tight integrity. Moreover, the circular structure provides compatibility with current clamps, clips and other mounting hardware utilized to secure the control and diagnostic system 62 within various components of the gas turbine engine 20.

The example wave guide tube 76 is fabricated from a metal material that provides protection against electro-magnetic interference (EMI) and high intensity radiated field (HIRF) proximate the wave guide assembly 74 and engine 20. The metal tube insures that transmissions through the wave guide 88 are not interfered with by external electronic noise or radiated fields. Moreover, the outer metal tube prevents tampering, disturbing or intrusion upon the signal utilized by the main transceiver to control and sense operation of the gas turbine engine 20.

Referring to FIGS. 6 thru 10, an example end fitting 84 is disclosed and includes a tubular portion 114 that flares outward to a flange 112. The flange 112 includes openings 116 for fasteners (not shown) to secure ends of the wave guide tube 76 to couplings, transceivers and other components. The end fitting 84 includes a circular cross-section that corresponds with the cross-section of the wave guide tube 76. The cross-section includes fluid passages 108a and 108b and a centrally located wave guide opening 106. Also included are conduits 110a and 110b that are disposed above and below the wave guide opening 106.

The end fitting 84 is attached to each distal end of the wave guide tube 76 and defines an end for coupling at each interface with another component, transceiver or coupler. The end fitting 84 includes a face 122 that defines the interface with other components of the wave guide assembly 74 such as the seal plate 86 and the coupling 82 (FIG. 3). The face 122 includes openings to the wave guide opening 106 and the fluid passages 108a and 108b. The face 122 also includes alignment pins 120a and 120b that extend outwardly. The alignment pins 120a, 120b provide for the precise alignment of the wave guide opening 106 of the end fitting 84 with the wave guide 88 of the wave guide tube 76 and other components.

The upper and lower conduits 110a and 110b are terminated at the face 122 in the form of connectors 118a and 118b. In this way, conductors are attached to the connectors 118a and 118b to provide a positive electrical connection at any joint interface with another component, coupling or guide tube 76. Although the example conductor embodiment includes electric power conduits or wires, it is also within the contemplation of this disclosure that the conductors may also include optic fibers and the connection include a corresponding connection for an optic fiber.

The end fitting 84 is secured to an end of the wave guide tubes 76 by welding or other means that provides for a precise alignment between the wave guide fluid passages 108a and 108b along with the conduits 110b and 110a. The connectors 118b and 118a provide a consistent durable electrical connection at the interface that is provided to correspond with electrical connections provided on the seal plate 86.

The alignment pins 120a and 120b fit into corresponding openings in components such as the sensor 78 and the component 80 of the gas turbine engine. The connectors 118a and 118b provide terminations and in this example are sealed by silicone rubber grommets that are secured within the end fitting. The rubber grommets protrude slightly from the fitting face 122 to ensure adequate and desired sealing and mating of electrical contacts and connections.

The alignment pins 120a and 120b include a length 126 that is longer than any electrical connection such that the alignment pins 120a, 120b are engaged before an electrical connection is made. The fitting alignment defined by the alignment pins 120a, 120b provide a desired orientation between the wave guide opening 106 and fluid passages 108a and 108b. Moreover, the precise alignment that is provided prior to any electrical pins being mated with the connectors 118a, 118b prevents potential damage due to misalignment and other problems potentially associated with misalignment during connection at an interface.

Figure 11:
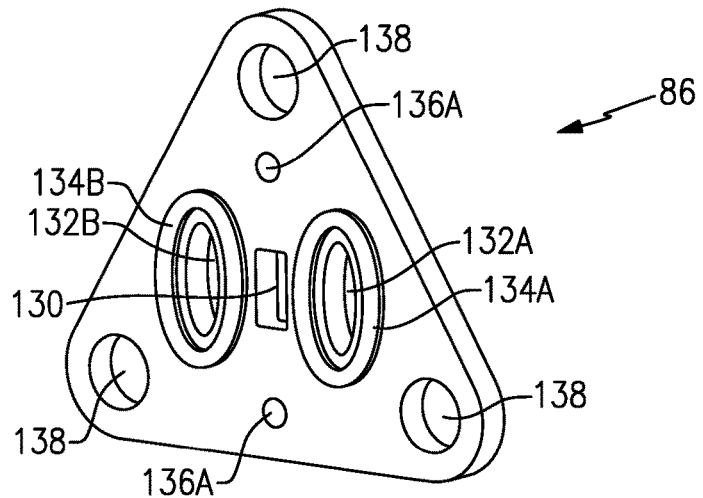
FIG. 11 is a perspective view of an example seal plate.
Figure 12:
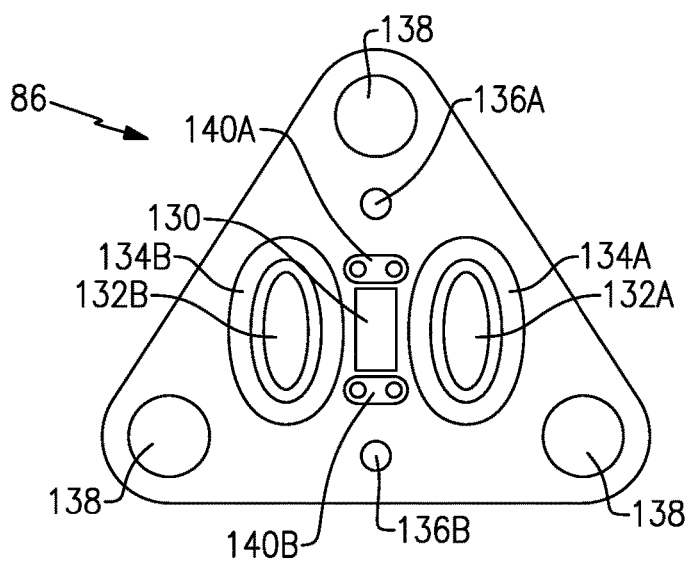
FIG. 12 is a front view of the example seal plate.
Figure 13:
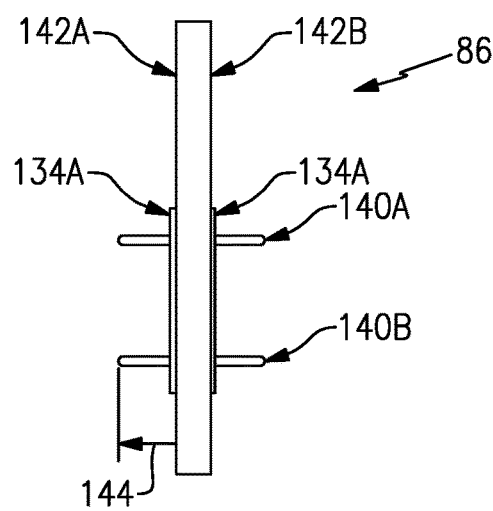
FIG. 13 is a side view of the example seal plate.

Referring to FIGS. 11, 12 and 13, an example seal plate 86 is shown and includes an opening 130 that extends through a first face 142a to a second face 142b. The seal plate 86 provides seals 134a and 134b about the fluid passage openings 132a and 132b. The seal plate 86 corresponds with a shape of the end fitting 84 and along with a face of coupling 82. Accordingly, a seal plate 86 is a substantially triangular that corresponds with the flange 112 of the end fitting 84.

The seal plate 86 includes a wave guide opening 130 as well as the fluid openings 132a and 132b. These openings line up with similar openings in the end fitting 84. The wave guide opening 130 as well as the fluid passage openings 132a and 132b are aligned and dimensioned relative to alignment openings 136a and 136b. The alignment openings 136a, 136b correspond with the alignment pins 120a and 120b of the end fitting 84. Accordingly, the seal plate 86 is assembled by inserting the alignment pins 120a and 120b of the end fitting 84 into the alignment openings 136a and 136b of the seal plate 86. The engagement between the seal plate 86 and the end fitting 84 aligns the wave guide 130 as well as the seals 134a and fluid passage opening 132a.

The seal plate 86 further includes an electrical connection by way of pins 140a and 140b. The pins 140a and 140b correspond with the connectors 118a and 118b that are disposed on the end fitting 84. The seal plate 86 includes openings 138 for fasteners that correspond with openings in the end fitting 116 to provide a desired fit and connection at each end in the wave guide assembly 74. The seals 134a and 134b surround each of the fluid passage openings 132a, 132b and extend outwardly from each face 142a and 142b as shown best in FIG. 13 to provide a desired fluid tight integrity through the interface.

Each of the connector pins 140a and 140b include a length 144 that is shorter than the length 126 (FIG. 9) of the alignment pins 120a and 120b. Accordingly, the alignment pins 120a, 120b engage the alignment openings 136a and 136b before the pins 140a and 140b engage the connector 118a and 118b of the end fitting 84. This prevents the pins 140a and 140b from contacting the corresponding connector 118a, 118b (FIG. 8) in a misaligned position.

Referring to FIGS. 14, 15, and 16, an example coupling 82 is disclosed and includes three end faces 150a, 150b and 150c. The coupling 82 splits into different paths the wave guide, the fluid passages and any electrical connections. In this way, a signal wave guide assembly 74 is utilized and split off to provide a signal transmission path that is in communication with several remotely located transceivers. The example coupling 82 includes three faces, however, the coupling may be utilized to provide an attachment point between several wave guide tubes 76.

The disclosed coupling 82 includes a body portion 152 that defines internal passageways that communicate and extend to each of the faces 150a, 150b and 150c. Each face 150a, 150b and 150c is substantially triangular in shape to correspond with the end fitting 84 and the seal plate 86. It should be appreciated although the example flanges are triangular in shape that other shapes could be utilized and within the contemplation of this disclosure. At each point of the substantially triangular face 150a, 150b and 150c includes a threaded hole 154 that receives fasteners that extend through openings in the end fitting 84 and seal plate 86. It should be appreciated that although a threaded opening 154 is disclosed other attachment methods may be utilized and are within the contemplation of this disclosure. For example, the threaded opening 154 could be a clearance opening and a nut and threaded fastener arrangement could be utilized to provide the connection between ends of the tubular wave guide tube 76.

Each face 150a, 150b, and 150c includes a wave guide opening 158 as well as fluid passage openings 156b and 156a. Also included are connectors 160a and 160b that correspond and engage the electrical pins 140a and 140b provided by the seal plate 86. Alignment openings 162a and 162b are also provided in each of the faces 150a, 150b and 150c to enable precise alignment of the wave guide 58 with the wave guide opening 130 of the seal plate 86 and wave guide opening 106 of the end fitting 84 which all correspond with the wave guide 88 defined within the wave guide tube 76.

Figure 17:
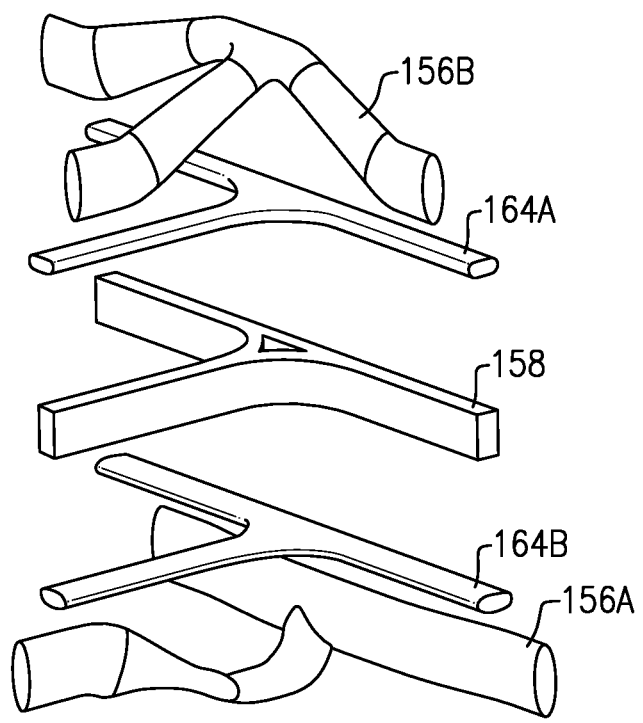
FIG. 17 is an exploded schematic view of passages through the example coupling.

Referring to FIG. 17 with continued reference to FIG. 14, the passages through the coupling 82 are intended to provide smooth transition between each of the end faces 150a, 150b and 150c. FIG. 17 is a schematic representation of the open spaces that define the passages through the coupling. It should be understood that the disclosed shapes are one disclosed embodiment provided for way of description and other shapes would also be within the contemplation of this disclosure.

In this disclosure, the wave guide 158 includes smooth transitions between each of the ends to provide desired smooth pathways between each of the end faces such that the wave form signals that are transmitted through the wave guide 158 are not inhibited, obstructed or disturbed.

Also included are passages 156a and 156b for communicating fluid through the coupling 82. The fluid passages 156a, 156b are shaped to fit within the coupling 82. Also provided are passages 164a and 164b that contain electrical conductors.

Figure 18:
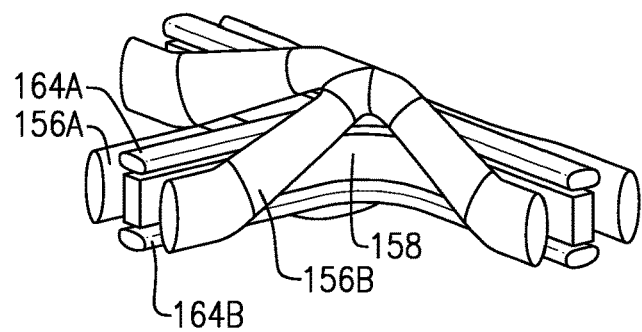
FIG. 18 is a perspective schematic view of the passages extending through the example coupling.
Figure 19:
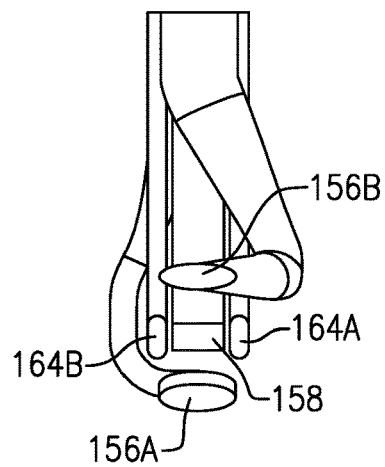
FIG. 19 is a side schematic view of the passages extending through the example coupling.
Figure 20:
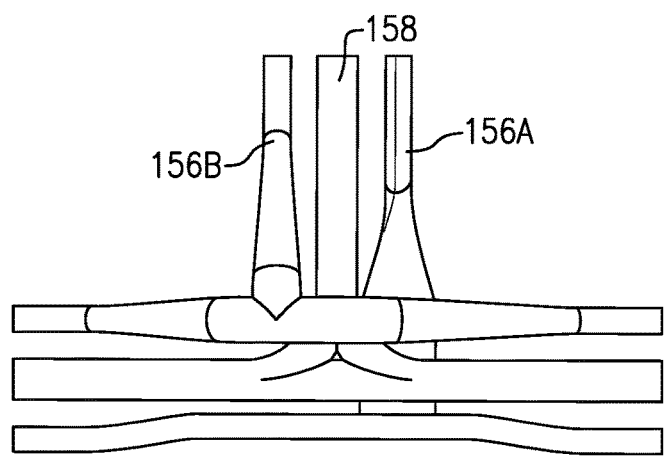
FIG. 20 is a top schematic view of the passages extending through the example coupling.

Referring to FIGS. 18, 19 and 20, to fit each of the passages within the coupling 82, the passages are orientated as shown in FIG. 18. The relative orientation to each other and through the coupling 82 provide for fluid communication, wave communication, as well as a pathway for the electrical conductors to each of the ends of coupling.

Figure 21:
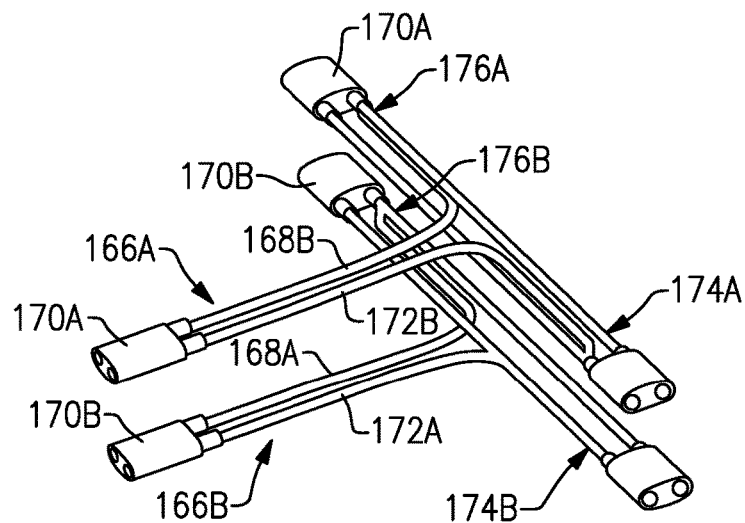
FIG. 21 is a perspective view of conductor assemblies of the example coupling.
Figure 22:
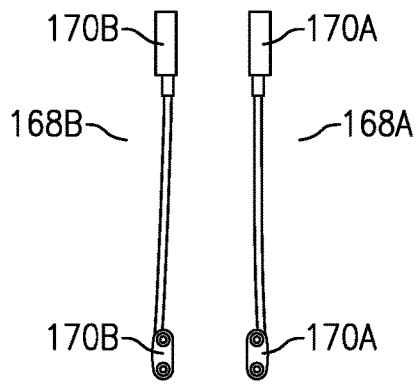
FIG. 22 is a side schematic view of the conductor assemblies.
Figure 23:
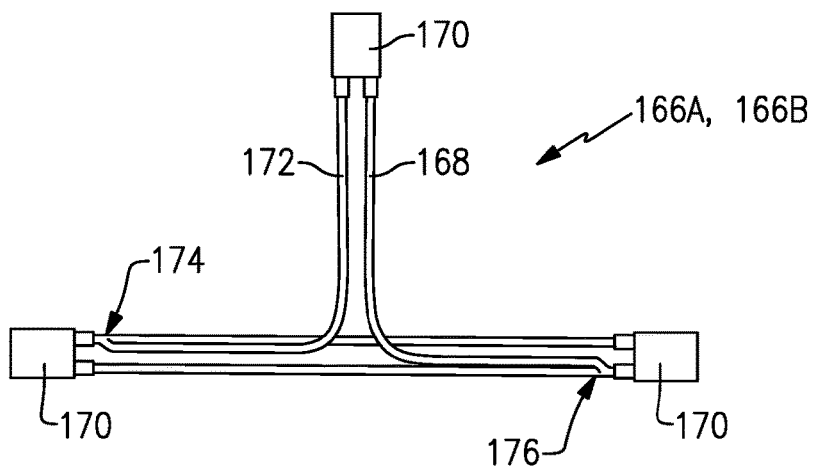
FIG. 23 is a top schematic view of the conductor assemblies.

Referring to FIGS. 21, 22 and 23 with continued reference to FIG. 18, the example conduits 164a and 164b extend between each of the faces 150a, 150b and 150c and include two conductor assemblies 166a and 166b. The first conductor assembly 166a is disposed within the passage 164a. In the orientation illustrated in FIG. 18, passage 164a is above the wave guide 158. The second conductor assembly 166b is disposed within the passage 164b disposed below the wave guide 158 as illustrated in FIG. 18.

Each of the conductor assemblies 166a and 166b includes a first conductor 168 and a second conductor 172. Each of the conductors 168, 172 extend between connectors 170 that are disposed at each of the end faces 150a, 150b and 150c. For each of the conductors 170 there is a crossover portion 174 and 176 that provides electrical communication for each of the three connectors 170. Accordingly, each of the conductors 172 and 168 are in communication with a corresponding connector 170 at each of the end faces of the coupling 82.

The example coupling 82 centrally locates the wave guide 158 to maintain the wave guide shape throughout and to provide a smooth transition for undisturbed transmission of a wave form signal.

Accordingly, the example wave guide assembly provides a compact transmission path for communication of wave form signals, fluid and electric signals to multiple locations within a gas turbine engine that simplifies communication, reduces complexity and improves durability and performance of control functions of a gas turbine engine.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A wave guide assembly for a control and diagnostic system for a machine, the wave guide assembly comprising:
a housing defining an exterior surface and an internal cavity extending between distal ends, the internal cavity including a cross-section defining a wave guide for providing a pathway for wave form signal communication between the distal ends, at least one open conduit providing a space for routing conductors through the housing, and a fluid passage separate from the wave guide.

2. The wave guide assembly as recited in claim 1, including an end fitting attached to each end of the housing, the end fitting including a flared tube tapering outward to an attachment flange.

3. The wave guide assembly as recited in claim 2, including a coupling for branching the wave guide and fluid passage into two separate paths extending in different directions, the coupling including three ends with a wave guide passage and a fluid coupling passage extending to each of the three ends.

4. The wave guide assembly as recited in claim 3, including a seal plate attached between the end fitting and the coupling, the seal plate including a wave guide opening corresponding to the wave guide, a fluid opening corresponding to the fluid passage and seals surrounding the fluid opening.

5. The wave guide assembly as recited in claim 4, including an alignment pin corresponding with an alignment opening for aligning the wave guide, at least one open conduit and fluid passage between the housing, seal plate, end fitting and coupling.

6. The wave guide assembly as recited in claim 1, wherein the wave guide comprises a rectangular passage in cross-section centered within the internal cavity, wherein the rectangular passage defines a size corresponding with a desired frequency range of a wave form signal.

7. The wave guide assembly as recited in claim 1, wherein the housing comprises a tube with a circular cross-section and the wave guide is centered within the cross-section.

8. The wave guide assembly as recited in claim 3, wherein the fluid passage comprises a first fluid passage and a second fluid passage disposed on opposite sides of the wave guide.

9. The wave guide assembly as recited in claim 8, wherein the coupling includes a first fluid coupling passage aligning with the first fluid passage and a second fluid coupling passage aligning with the second fluid passage and each of the first fluid coupling passage and the second fluid coupling passage extends to each of the three ends of the coupling.

10. The wave guide assembly as recited in claim 9, wherein the coupling includes a conductor assembly branching a conductor between each of the three ends.

11. A control and diagnostic system for a machine comprising:
a main transceiver mounted proximate the machine, the transceiver generating and receiving radio frequency waves corresponding to information for control and monitoring of engine operation;
a wave guide assembly in communication with the main transceiver, the wave guide assembly including a housing defining an internal cavity and an end fitting attached to each end of the housing, the internal cavity including a wave guide defining a transmission path for a wave form signal communicated with the main transceiver and a fluid passage separate from the wave guide defining a flow path for fluid;
a fluid source in communication with the fluid passage of the wave guide assembly; and
at least one remote transceiver attached to an end of the wave guide assembly and in communication with the main transceiver through a wave form signal communicated through the wave guide; and
at least one fluid device in fluid communication with the fluid passage defined within the wave guide assembly.

12. The control and diagnostic system as recited in claim 11, wherein the wave guide assembly comprises a tubular housing defining a circular cross-section, the wave guide defining a rectangular passage centered within the circular cross-section and the at least one fluid passage comprises a first fluid passage and a second fluid passage defined on opposite sides of the wave guide.

13. The control and diagnostic system as recited in claim 12, including a coupling for branching the wave guide and fluid passages into two separate paths extending in different directions, the coupling including three ends with a wave guide passage and a fluid coupling passage extending to each of the three ends.

14. The control and diagnostic system as recited in claim 13, including a seal plate attached between the end fitting and the coupling, the seal plate including a wave guide opening corresponding to the wave guide, a fluid opening corresponding to the fluid passage and seals surrounding the fluid opening.

15. The control and diagnostic system as recited in claim 14 wherein wave guide comprises a rectangular cross-section that defines a size corresponding with a desired frequency range of a wave form signal.

16. A gas turbine engine comprising:
a control and diagnostic system including:
a main transceiver mounted proximate the gas turbine engine, the transceiver generating and receiving radio frequency waves corresponding to information for control and monitoring of engine operation;
a wave guide assembly in communication with the main transceiver, the wave guide assembly comprising a housing defining an internal cavity and an end fitting attached to each end of the housing, the internal cavity including a wave guide defining a transmission path for a wave form signal communicated with the main transceiver and a fluid passage separate from the wave guide defining a flow path for fluid;
a fluid source in communication with the fluid passage of the wave guide assembly; and
at least one remote transceiver attached to an end of the wave guide assembly and in communication with the main transceiver through a wave form signal communicated through the wave guide; and at least one fluid device in fluid communication with the fluid passage defined within the wave guide assembly.

17. The gas turbine engine as recited in claim 16, wherein the wave guide assembly comprises a tubular housing defining a circular cross-section, the wave guide defining a rectangular passage centered within the circular cross-section and the at least one fluid passage comprises a first fluid passage and a second fluid passage defined on opposite sides of the wave guide.

18. The gas turbine engine as recited in claim 17, including a coupling for branching the wave guide and fluid passages into two separate paths extending in different directions, the coupling including three ends with a wave guide passage and a fluid coupling passage extending to each of the three ends.

19. The gas turbine engine as recited in claim 18, including a seal plate attached between the end fitting and the coupling, the seal plate including a wave guide opening corresponding to the wave guide, a fluid opening corresponding to the fluid passage and seals surrounding the fluid opening.

20. The gas turbine engine as recited in claim 19 wherein wave guide comprises a rectangular cross-section that defines a size corresponding with a desired frequency range of a wave form signal.

* * * * *